US011182682B2

(12) United States Patent
Stoilos et al.

(10) Patent No.: US 11,182,682 B2
(45) Date of Patent: Nov. 23, 2021

(54) SYSTEM FOR EXTRACTING SEMANTIC TRIPLES FOR BUILDING A KNOWLEDGE BASE

(71) Applicant: Babylon Partners Limited, London (GB)

(72) Inventors: Georgios Stoilos, London (GB); Jonathan Moore, London (GB); Damir Juric, London (GB); Mohammad Khodadadi, London (GB)

(73) Assignee: Babylon Partners Limited, London (GB)

( * ) Notice: Subject to any disclaimer, the term of this patent is extended or adjusted under 35 U.S.C. 154(b) by 180 days.

(21) Appl. No.: 16/662,654

(22) Filed: Oct. 24, 2019

(65) Prior Publication Data

US 2020/0160194 A1    May 21, 2020

Related U.S. Application Data

(63) Continuation of application No. 16/194,156, filed on Nov. 16, 2018, now Pat. No. 10,482,384.

(51) Int. Cl.
*G06N 5/02* (2006.01)
*G06F 16/36* (2019.01)
(Continued)

(52) U.S. Cl.
CPC ............ *G06N 5/027* (2013.01); *G06F 16/335* (2019.01); *G06F 16/3344* (2019.01); *G06F 16/36* (2019.01); *G06F 40/30* (2020.01)

(58) Field of Classification Search
CPC ....... G06N 5/027; G06F 16/36; G06F 16/335; G06F 16/3344; G06F 40/30
(Continued)

(56) References Cited

U.S. PATENT DOCUMENTS 7,383,169 B1 * 6/2008 Vanderwende ......... G06F 40/30
704/9
8,359,193 B2    1/2013 Chen
(Continued)

OTHER PUBLICATIONS

Tan, Chun How, et al., "Trust, but Verify: Predicting Contribution Quality for Knowledge Base Construction and Curation", WSDM '14, New York, NY, Feb. 24-28, 2014, pp. 553-562.*
(Continued)

*Primary Examiner* — Robert Stevens
(74) *Attorney, Agent, or Firm* — McDermott Will & Emery LLP

(57) ABSTRACT

The present disclosure relates to a computer-implemented method of verifying a semantic triple generated for building a knowledge base including data patterns defining concepts associated with semantic triples derived from unstructured text. The method includes providing the semantic triple to a user interface, the semantic triple including a subject, an object, and a relation. The method also includes receiving, from the user interface, an acceptance or a rejection of the subject, the object, and the relation as relevant or not to the knowledge base. The method also includes transmitting the semantic triple for inclusion as a data pattern in the knowledge base in the event that all of the subject, the object, and the relation, have been accepted.

20 Claims, 7 Drawing Sheets

(51) Int. Cl.
G06F 16/335 (2019.01)
G06F 16/33 (2019.01)
G06F 40/30 (2020.01)

(58) Field of Classification Search
USPC .......................................................... 707/769
See application file for complete search history.

(56) References Cited

U.S. PATENT DOCUMENTS

| | | | |
|---|---|---|---|
| 8,521,505 | B2 | 8/2013 | Arning |
| 9,110,882 | B2 | 8/2015 | Overell |
| 10,019,537 | B1 | 7/2018 | Tsypliaev |
| 2008/0005147 | A1 | 1/2008 | Khushraj |
| 2009/0070322 | A1* | 3/2009 | Salvetti ............... G06F 16/3334 |
| 2013/0212057 | A1 | 8/2013 | Lee |
| 2013/0246046 | A1* | 9/2013 | Fan ......................... G06F 40/30 |
| | | | 704/9 |
| 2014/0237000 | A1 | 8/2014 | Lorge |
| 2015/0019593 | A1 | 1/2015 | Kaufman |
| 2015/0339573 | A1 | 11/2015 | Finn |
| 2016/0132572 | A1* | 5/2016 | Chang ................... G06F 16/116 |
| | | | 707/723 |
| 2016/0171099 | A1* | 6/2016 | Lorge .................... G06F 16/951 |
| | | | 707/756 |
| 2016/0275180 | A1* | 9/2016 | Matskevich ........ G06F 16/3344 |
| 2017/0371923 | A1 | 12/2017 | Arroyo |

OTHER PUBLICATIONS

Prasojo, Radityo Eko, et al., "Modeling and Summarizing News Events Using Semantic Triples", ESWC 2018, Heraklion, Crete, Greece, Jun. 3-7, 2018, pp. 512-527.*

Sateli, Bahar, et al., "Automatic Construction of a Semantic Knowledge Base from CEUR Workshop Proceedings", Second SemWebEval Challenge at ESWC 2015, Portorož, Slovenia, May 31-Jun. 4, 2015, 12 pages.*

De Sa, Christopher, et al., "DeepDive: Declarative Knowledge Base Construction", SIGMOD Record, vol. 45, No. 1, Mar. 2016, pp. 60-67.*

"Semantic triple", Wikipedia, downloaded from: https://en.wikipedia.org/wiki/Semantic_triple, Jul. 1, 2021, pp. 1-2.*

Zaveri, A., et al., "User-driven quality evaluation of dbpedia", Proceedings of the 9th International Conference on Semantic Systems, I-SEMANTICS '13, pp. 97-104. ACM, 2013.

Paulheim, H., et al., "Improving the quality of linked data using statistical distributions", International Journal of Semantic Web and Information Systems, 10(2): 63-86, 2014. ISSN 1552-6283.

Ruan, T., et al., "An automatic approach for constructing a knowledge base of symptoms in Chinese", Journal of Biomedical Semantics, 8(1):33, Sep. 2017, 9 pages.

Salvadores, M., et al., "Bioportal as a dataset of linked ontologies and terminologies in RDF", Semantic Web, 4(3):277-284, 2013.

Schriml, L., "Disease ontologoy: a backbone for disease semantic integration", Nucleic Acids Research, 40(Database-Issue):940-946, 2012.

Shi, L., et al., "Semantic health knowledge graph: Semantic integration of heterogenerous medical knowledge and services.", BioMed Research International, 2017 (Article ID 2858423), 2017, pp. 1-12.

Toutanova, K., et al., "Observed versus latent features for knowledge base and text inference", In 3rd Workshop on Continuous Vector Space Models and Their Compositionality. ACL Association for Computational Linguistics, 2015, 10 pages.

Yahya, M., et al., "Fact extraction for normal attributes ", In Proceedings of the 2014 Conference on Empirical Methods in National Language Processing, EMNLP, pp. 325-335, 2014.

Miwa, M., et al., "Entity-focused sentence simplification for relation extraction. In Proceedings of the 23rd International Conference on Computational Linguistics, COLING "10, pp. 788-796, 2010.

Nickel, M., et al., "A review of relational machine learning for knowledge graphs", Proceedings of the IEEE, 104(1):11-33, 2016.

Oberkampf, H., et al., "From symptoms to diseases—creating the missing link", In Proceedings of the 12th European Semantic Web Conference (ESWC), 2015, 16 pages.

Hachey, B., et al., "Evaluating entity linking with Wikipedia", Artificial Intelligence, 194:130-150, 2013.

He, L., et al., "Deep semantic role labeling: What works and what's next", In Proceedings of the 55th Annual Meeting of the Association for Computational Linguistics, (ACL), pp. 473-483, 2017.

Kubler, S., et al., "Dependency Parsing", Synthesis Lectures on Human Language Technologies. Morgan & Claypool Publishers, 2009, 5 pages.

Li, X., et al., "Truth finding on the deep web: Is the problem solved?", PVLDB, 6(2):97-108, 2012.

Meilicke, C., et al., "Fine-grained evaluation of rule- and embedding-based systems for knowledge graph completion", In International Semantic Web Conference (ISWC), vol. 11136, pp. 3-20, 2018.

Melo, A., et al., "Detection of relation assertion errors in knowledge graphs", In Proceedings of the Knowledge Capture Conference (K-CAP), pp. 22:1-22:8, New York, NY, USA, 2017. ACM, ISBN 978-1-4503-5553-7.

Mhadhbi, L., et al., "A disease-symptom ontology for general diagnosis enhancement", In Proceedings of the 2017 International Conference on Information System and Data Mining, ICISDM '17, pp. 99-102, 2017.

Mintz, M., et al., "Distant supervision for relation extraction without labeled data", In Proceedings of the Joint Conference of the 47th Annual Meeting of the ACL and the 4th International Joint Conference on National Language Processing of the AFNLP, pp. 1003-1011, 2009.

Ernst, P., et al., "Highlife: Higher-arity fact harvesting", In Proceedings of the 2018 World Wide Web Conference on World Wide Web, WWW 2018, pp. 1013-1022, 2018.

Etzioni, O., et al., "Machine reading", In Proceedings of the 21st National Conference on Artificial Intelligence (AAAI), pp. 1517-1519, 2006.

Fader, A., et al., "Identifying relations for open information extraction", In Proceedings of the Conference on Empirical Methods in Natural Language Processing (EMNLP), pp. 1535-1545, 2011. ISBN 978-1-937284-11-4.

Golbeck, J., et al., "The national cancer institute's thesaurus and ontology", Journal of Web Semantics, 1(1):, 2003, 5 pages.

Banko, M., et al., "Open information extraction from the web", In Proceedings of the 20th International Joint Conference on Artifical Intelligence (IJCAI), pp. 2670-2676, 2007.

Bordes, A., et al., Translating embeddings for modeling multi-relational data, In C.J.C. Burges, L. Bottou, M. Welling, Z. Ghahramani, and K.Q. Weinberger, editors, Advances in Neural Information Processing Systems 26, pp. 1-9. Curran Associates, Inc., 2013.

Cer, D., et al., "Universal Sentence encoder", CoRr, abs/1803.11175, 2018. URL: http://arxiv.org/abs/1803.11175, 7 pages.

Christensen, J., et al., "An analysis of open information extraction based on semantic role labeling", In Proceedings of the Sixth International Conference on Knowledge Capture (K-CAP), pp. 113-120, 2011.

Dong, X., et al., "Knowledge vault: a web-scale approach to probabilistic knowledge fusion", In the 20th ACM SIGKDD International Conference on Knowledge Discovery and Data Mining, KDD, pp. 601-610, 2014.

Ernst, P., et al., "Knowlife: a versatile approach for constructing a large knowledge graph for biomedical sciences", BMC Bioinformatics, 16:157:1-157:13, 2015.

Nickel, M., et al., "A three-way model for collective learning on multi-relational data ", In Proceedings of the 28th International Conference on Machine Learning (ICML), pp. 809-816, 2011, ISBN 978-1-4503-0619-5.

Rubin, D., et al., "Using ontologies linked with geometric models to reason about penetrating injuries.", Artificial Intelligence in Medicine, 37(3): 167-176, 2006.

Yahya, M., et al., "Robust Question Answering over the Web of Linked Data", CIKM 2013, San Francisco, CA, Oct. 27-Nov. 1, 2013, pp. 1107-1116.

(56) References Cited

OTHER PUBLICATIONS

Haag, F., et al., "Visual SPARQL Querying Based on Extended Filter/Flow Graphs", AVI '14, Como, Italy, May 27-30, 2014, pp. 305-312.

* cited by examiner

SYSTEM FOR EXTRACTING SEMANTIC TRIPLES FOR BUILDING A KNOWLEDGE BASE

CROSS-REFERENCE TO RELATED APPLICATIONS

This application claims the benefit of priority under 35 U.S.C. § 120 as a continuation of U.S. patent application Ser. No. 16/194,156, filed on Nov. 16, 2018, the contents of which are hereby incorporated by reference in its entirety for all purposes.

FIELD

Embodiments described herein relate to methods and systems for building a knowledge base (KB) that define an ontology.

BACKGROUND

KBs have been created for use in semantic annotation of documents (either text or images), semantic search, reasoning, automated diagnostics, dialogue-systems, and many more knowledge-based applications. A KB includes a plurality of concepts and relationships linking the concepts. It is typically created manually by domain experts but this can be laborious, time-consuming, and can come with high cost. Alternatively, it can also be constructed (semi-)automatically by inputting text, identifying sentences in the text, deriving semantic triples from the sentences, and then storing these triples or linking them to an existing KB. In this way, the KB can be created and augmented.

It is an object of the present disclosure to improve on the prior art. In particular, the present disclosure addresses a technical problem tied to computer technology and arising in the realm of computer networks, namely the technical problem of slow transmission speed. The disclosed system solves this technical problem by reducing the number of semantic triples transmitted through the system for inclusion in a knowledge base. In addition, the system transmits higher quality triples for inclusion in the knowledge base resulting in reduced processing required when searching the knowledge base during use.

SUMMARY

According to an aspect of the present disclosure, there is provided a computer-implemented method of generating a semantic triple for building a knowledge base to include data patterns associated with semantic triples derived from unstructured text, the method comprising: providing a sentence associated with unstructured text including a main verb and a taxonomic verb, the taxonomic verb describing a taxonomic relationship; generating a first frame including a first subject, a first relation, and a first object, the first relation including the main verb, wherein the first subject and the first object each include a phrase including one or more sub-strings; generating a second frame including a second subject, a second relation, and a second object, the second relation including the taxonomic verb, wherein the second subject and the second object each include a phrase including one or more sub-strings; identifying a common sub-string in the first subject and either the second subject or the second object, or a common sub-string in the first object and either the second subject or the second object; generating a semantic triple using the first frame and replacing the first subject or the first object having the common sub-string with the second subject or the second object having the common sub-string; and transmitting the semantic triple for inclusion as a data pattern in the knowledge base.

The taxonomic verb may stem from the base verb to be.

According to a further aspect of the present disclosure, there is provided a computer-implemented method of generating a semantic triple for building a knowledge base to include data patterns associated with semantic triples derived from unstructured text, the method comprising: providing a semantic triple including a subject, a relation, and an object, the subject and the object each including a phrase including one or more sub-strings, and the relation including a verb; identifying that one of the sub-strings of the subject expresses a relation between the other sub-strings of the subject and the object, or that one of the sub-strings of the object expresses a relation between the other sub-strings of the object and the subject; generating a modified semantic triple by: replacing the relation of the triple in the sub-string of the subject or the object, identified as expressing the relation, with the relation; and replacing the subject or the object, including the sub-string expressing the relation, with the remaining sub-strings not used to replace the relation of the triple; and transmitting the modified semantic triple for inclusion as a data pattern in the knowledge base.

The identified sub-string may be a noun selected from a pre-defined list of nouns known to express a relation.

According to a further aspect of the present disclosure, there is provided a computer-implemented method of building a knowledge base to include data patterns defining concepts associated with semantic triples derived from unstructured text, the method comprising: providing a semantic triple including a relation, a subject, and an object, where the subject or the object has no corresponding concept in the knowledge base; determining one or more concepts in the knowledge base related to the subject or the object not having a corresponding concept in the knowledge base; determining a value corresponding to how closely matched the one or more concepts are to the subject or the object; ordering the one or more concepts based on the value; and linking the highest ordered concept to the subject or the object having no corresponding concept in the knowledge base.

Determining the one or more concepts in the knowledge base related to the subject or the object not having a corresponding concept in the knowledge base may include generating a numerical vector defining the subject or the object, and wherein determining the value corresponding to how closely matched the one or more concepts are to the sentence may include comparing the numerical vector to a vector or each concept in the knowledge base to obtain the value.

Linking the highest order concept to the subject or the object may include adding the subject or the object as data defining a new concept in the database, and linking the new concept to the highest ordered concept as a semantic type.

According to a further aspect of the present disclosure, there is provided a computer-implemented method of filtering semantic triples generated for building a knowledge base including data patterns defining concepts associated with semantic triples derived from unstructured text, the method comprising: receiving a semantic triple including a subject, a relation, and an object; comparing the relation to a pre-defined set of relevant relations; accepting the semantic triple in the event that the relation is present in the pre-defined set of relevant relations, and rejecting the semantic triple in the event that the relation is not present in the pre-defined set of relevant relations; and if the semantic triple is accepted, transmitting the accepted semantic triple for inclusion as a data pattern in the knowledge base, and if the semantic triple is rejected, discarding the semantic triple.

The relevant relations may include cause, treat, affect, characterize, develop, lead, aggravate, alleviate, damage, obstruct, trigger, transmit, spread, prevent, produce, misdiagnose, and induce.

According to a further aspect of the present disclosure, there is provided a computer-implemented method of filtering semantic triples generated for building a knowledge base including data patterns defining concepts associated with semantic triples derived from unstructured text, the method comprising: receiving a semantic triple including a subject, a relation, and an object; comparing the subject and the object to a pre-defined set of semantic types; accepting the semantic triple in the event that the subject and the object are present in the pre-defined set of semantic types, and rejecting the semantic triple in the event that subject and the object are not present in the pre-defined set of semantic types; and if the semantic triple is accepted, transmitting the accepted semantic triple for inclusion as a data pattern in the knowledge base, and if the semantic triple is rejected, discarding the semantic triple.

The pre-defined set of semantic types may include clinical finding, disease, substance, procedure, animal, manufactured object, body part, body substance, biological function, behaviour, and organism.

According to a further aspect of the present disclosure, there is provided a computer-implemented method of filtering semantic triples generated for building a knowledge base including data patterns defining concepts associated with semantic triples derived from unstructured text, the method comprising: receiving a semantic triple including a subject, a relation, and an object; determining a numerical value of the relevance of the semantic triple to the knowledge base; ranking the plurality of triples according to the numerical values; and transmitting the semantic triples having a numerical value above a threshold for inclusion as a data pattern in the knowledge base and discarding the semantic triples having a numerical value below the threshold.

The numerical value may indicate a frequency at which a semantic triple occurs from among the plurality of semantic triples.

The numerical value may be determined by learning a model from the data patterns of the knowledge base and comparing the plurality of semantic triples to the model.

According to a further aspect of the present disclosure, there is provided a computer-implemented method of verifying a semantic triple generated for building a knowledge base including data patterns defining concepts associated with semantic triples derived from unstructured text, the method comprising: providing the semantic triple to a user interface, the semantic triple including a subject, an object, and a relation; receiving, from the user interface, an acceptance or a rejection of the subject, the object, and the relation as relevant or not to the knowledge base; and transmitting the semantic triple for inclusion as a data pattern in the knowledge base in the event that all of the subject, the object, and the relation have been accepted.

The method may further comprise storing in a database an accepted or a rejected subject, object, or relation from a verified semantic triple.

The method may further comprise comparing the semantic triple to the database, and providing the semantic triple to the user interface if the semantic triple has not been provided to the user interface previously, and discarding the semantic triple if the triple has been accepted or rejected previously.

The method may further comprise adding a new identifier for a newly encountered entity. The method may further comprise verifying a correctness of the semantic triple. The method may further comprise verifying assigned phrases of the semantic triple. The method may further comprise verifying a correctness of the semantic triple.

According to a further aspect of the present disclosure, there is provided a system including a processor, and a memory, the memory including instructions which, when executed by the processor, cause the processor to perform any of the foregoing methods.

According to a further aspect of the present disclosure, there is provided a non-transitory computer-readable medium including instructions which, when executed by a processor, cause the processor to perform any of the foregoing methods.

BRIEF DESCRIPTION OF THE FIGURES

The present disclosure is best described with reference to the accompanying figures, in which.

DETAILED DESCRIPTION OF THE FIGURES

However, there are limitations associated with conventional approaches to creating and augmenting ontologies. For instance, poor quality or erroneous triples can be created and linked to the ontology, which are ultimately of low value and seldom used. Augmenting the ontology in this way results in wasted bandwidth as a result of transmitting the large amount of poor quality and erroneous triples for linking to the ontology. In addition, inefficient processing results from using the ontology as a result of the high number of poor quality and erroneous triples. Moreover, this results in increased requirements for storage, as these need to be saved.

Figure 1:
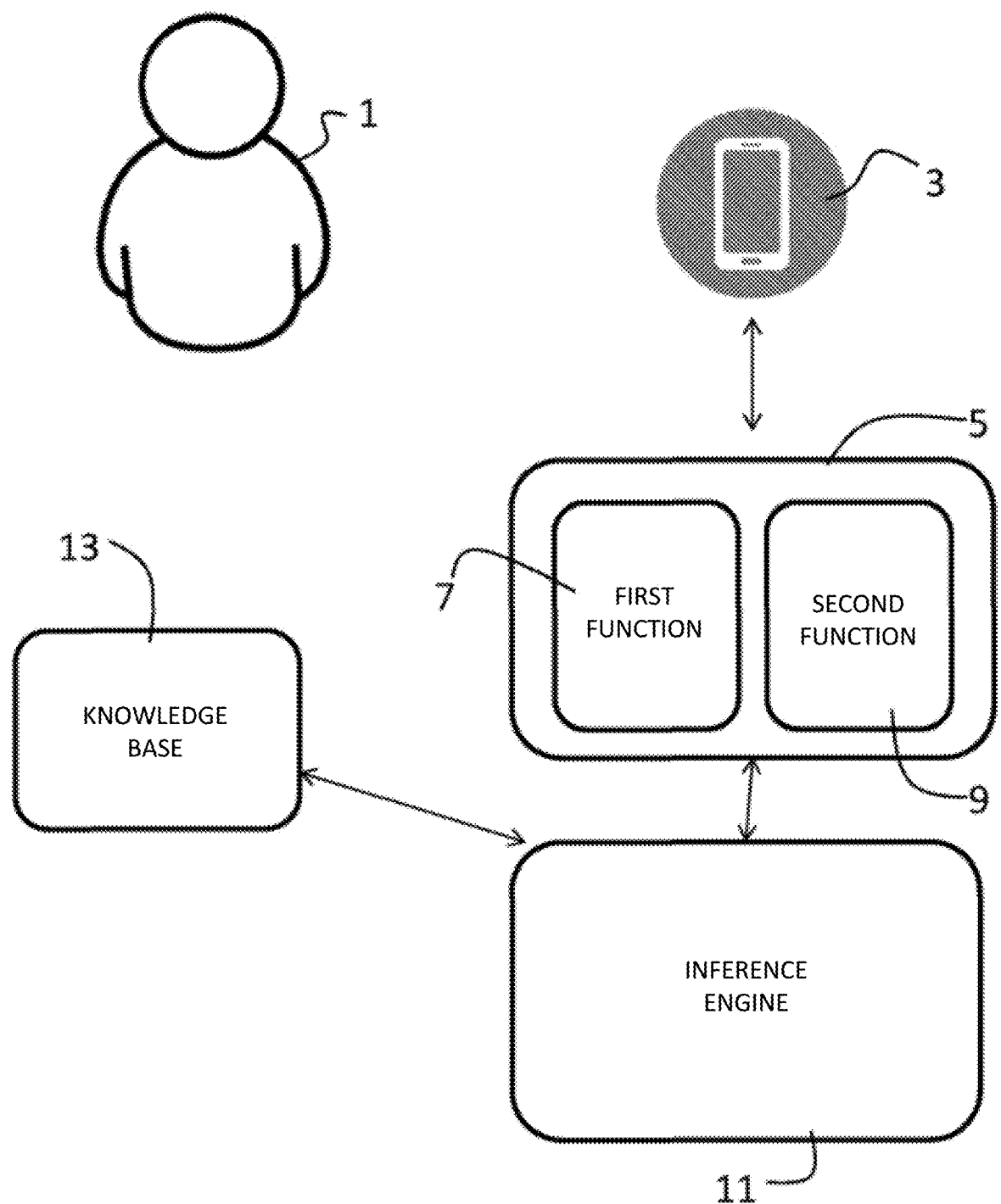
FIG. 1 shows a schematic of a system in accordance with the present disclosure.

FIG. 1 is a schematic of a diagnostic system. In one embodiment, a user 1 communicates with the system via a mobile phone 3. However, any device could be used which is capable of communicating information over a computer network, for example, a laptop, tablet computer, information point, fixed computer, voice assistant, etc.

The mobile phone 3 will communicate with interface 5. Interface 5 has two primary functions, the first function 7 is to take the words uttered by the user and turn them into a form that can be understood by the inference engine 11. The second function 9 is to take the output of the inference engine 11 and to send this back to the user's mobile phone 3.

In some embodiments, Natural Language Processing (NLP) is used in the interface 5. NLP is one of the tools used to interpret, understand, and then use everyday human language and language patterns. It breaks both speech and text down into shorter components and interprets these more manageable blocks to understand what each individual component means and how it contributes to the overall meaning, linking the occurrence of medical terms to the knowledge base. Through NLP it is possible to transcribe consultations, summarise clinical records, and chat with users in a more natural, human way.

However, simply understanding how users express their symptoms and risk factors is not enough to identify and provide reasons about the underlying set of diseases. For this, the inference engine 11 is used. The inference engine 11 is a powerful set of machine learning systems, capable of reasoning on a space of more than hundreds of billions of combinations of symptoms, diseases and risk factors, per second, to suggest possible underlying conditions. The inference engine 11 can provide reasoning efficiently, at scale, to bring healthcare to millions.

In an embodiment, the knowledge base 13 is a large structured set of data defining a medical knowledge base. The knowledge base 13 describes an ontology, which in this case relates to the medical field. It captures human knowledge on modern medicine encoded for machines. This is used to allow the above components to speak to each other. The knowledge base 13 keeps track of the meaning behind medical terminology across different medical systems and different languages. In particular, the knowledge base 13 includes data patterns describing a plurality of semantic triples, each including a medical related subject, a medical related object, and a relation linking the subject and the object. An example use of the knowledge base would be in automatic diagnostics, where the user 1, via mobile device 3, inputs symptoms they are currently experiencing, and the interface engine 11 identifies possible causes of the symptoms using the semantic triples from the knowledge base 13.

The subject-matter of this disclosure relates to creating and enhancing the knowledge base 13 based on information described in unstructured text.

Figure 2:
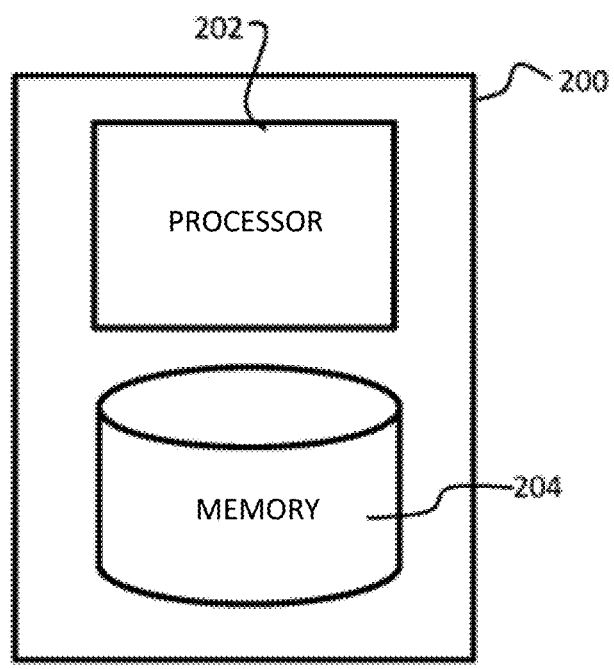
FIG. 2 shows a computer for implementing the methods according to the embodiments described herein.

With reference to FIG. 2, a computer 200 is provided to enable the interface engine 11 and the knowledge base 13 (from FIG. 1) to operate. The computer 200 includes a processor 202 and a memory 204. The memory 204 may include a non-transitory computer-readable medium for storing electronic data. The electronic data may include instructions which, when executed by the processor 202, cause the processor to perform one or more of the methods described herein.

Figure 3:
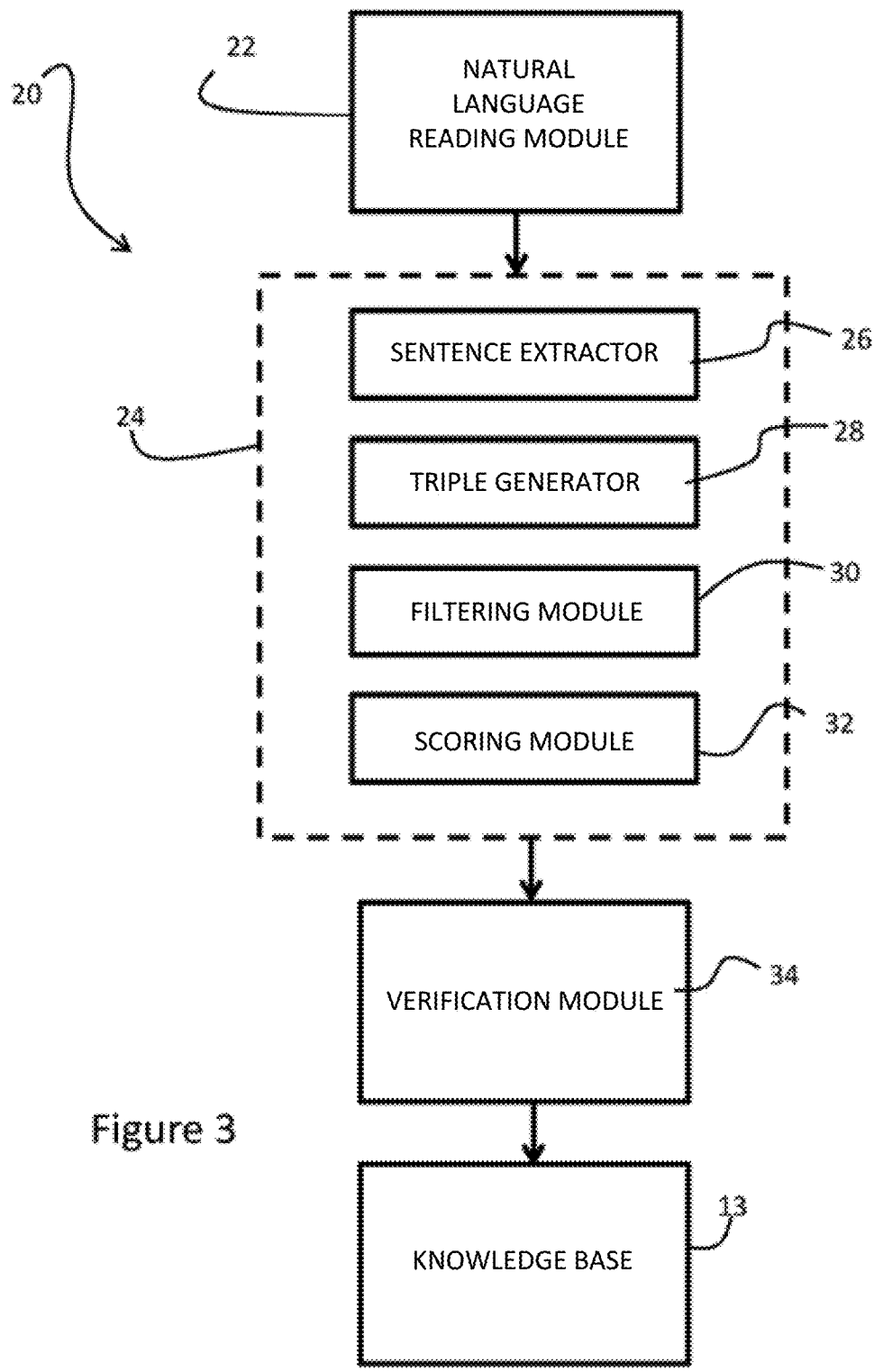
FIG. 3 shows a schematic of an ontology building system.

With reference to FIG. 3, an ontology building system 20 is provided as electronic data in the memory 204 in the form of various modules described below. The modules are executed by the processor 202 to perform the functions of the interface engine 11. The ontology building system 20 includes a natural language reading module 22 arranged to read natural language text. The ontology building system 20 also includes a semantic triple generation module 24, including: a sentence extractor 26 arranged to extract sentences from the natural language reading module 22, a semantic triple generator 28 arranged to derive a semantic triple from the sentence, a filtering module 30 arranged to filer the semantic triples, and a scoring module 32 arranged to score and rank the triples. The ontology building system 20 also includes a verification module 34 provided as a user interface for facilitating domain experts to verify the suitability of the semantic triples for addition to the knowledge base 13.

Figure 4:
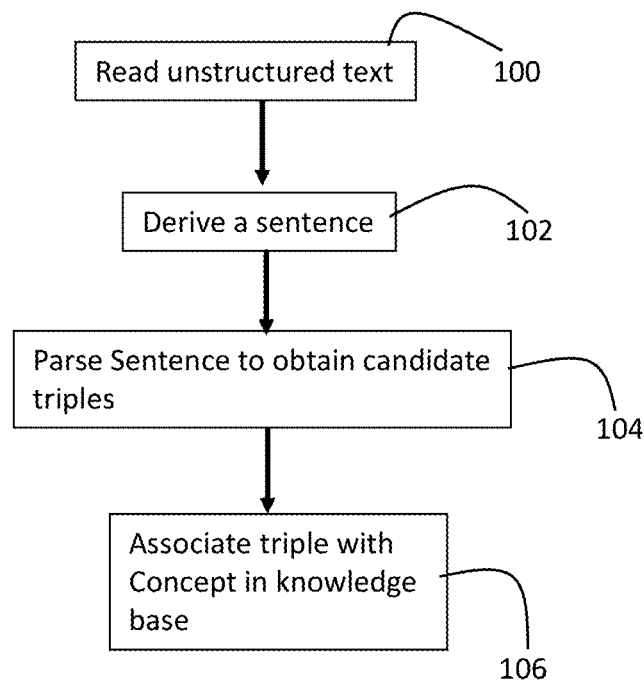
FIG. 4 shows a flow chart of a semantic role labelling method for creating a knowledge base according to an embodiment.

With reference to FIG. 4, a triple is extracted from unstructured text by the semantic triple generation module 24 (FIG. 3), and in particular using the algorithm specified in Algorithm 1 below.

```
Input: A sentence sent.
 1: F := srlParse(sent)
 2: eliminateCopulaVerbs(sent, F)
 3: triples := seekAndGet(F, ARG0, {ARG1, ARG2}) ∪ seekAndGet(F, ARG1, {ARG2})∪
         seekAndGet(F, ARG1, {ARG0}) ∪ flip(seekAndGet(F, ARG2, {ARG1}), ∀ )
 4: outputTriples := ∅
 5: for all ⟨phr₁ verb phr₂⟩ ∈ triples do
 6:     if verb ∈ {"include", "is"} then
 7:         nounRelationRewriting(⟨phr₁ verb phr₂⟩)
 8:     end if
 9:     outputTriples := outputTriples ∪ {(link(phr₁) link(verb) link(phr₂))}
10: end for
11: return outputTriples
```

At step 100, the unstructured text is initially stored in the memory 204 as electronic data. The electronic data defining the unstructured text is read by the natural language reading module 22 (FIG. 3) to generate a sentence, "sent." Unstructured text comes in many forms, and in this case relates to medical literature, such as patient notes or medical journals. In step 102, the electronic data defining the body of unstructured text is retrieved by the processor 202 (FIG. 2) and is split into sentences using a sentence tokenisation process by the natural language reading module 22 (FIG. 3). The sentence tokenisation process looks for sentence boundaries, but is configured to avoid recognising "." when used to denote an abbreviation as a sentence boundary. Each sentence derived from the sentence tokenisation is stored in the memory 202 (FIG. 2) as electronic data and is saved with meta data. Meta data can include, for example, the title of the document, source name, URI, time, etc.

Often medical texts (medical encyclopaedias, web portals, etc.) will employ patterns in the free text that require further processing. For example, an excerpt might read:

Common causes of a short-term cough include:
- an upper respiratory tract infection (URTI) that affects the throat, windpipe or sinuses—examples are a cold, flu, laryngitis, sinusitis, or whooping cough
- a lower respiratory tract infection (LRTI) that affects your lungs or lower airways—examples are acute bronchitis or pneumonia
- an allergy, such as allergic rhinitis or hay fever
- a flare-up of a long-term condition such as asthma, chronic obstructive pulmonary disease (COPD) or chronic bronchitis
- inhaled dust or smoke Symptom and cause relationships can be represented through iterations, a list of symptoms/diseases tied to the governing sentence at the top of the pattern. To be able to harvest this data, it is not possible to consider each sentence in isolation. Instead, in an embodiment, if such a pattern is recognised, the sentences are re-written to accommodate for this pattern. The re-written sentences are stored in the memory 204 as electronic data (FIG. 2). For example, in the above example, where possible causes of a short term cough are listed, the sentences are re-written such that each sentence starts with the same governing part but have different attachments at the end.

In the above example, this will produce:

Common causes of a short-term cough include an upper respiratory tract infection that affects the throat, windpipe or sinuses.

Common causes of a short-term cough include a lower respiratory tract infection that affects your lungs or lower airways.

In step 104, the electronic data defining the sentence, sent, is retrieved by the processor, when the semantic triple generation module 24 is executed. The sentence is parsed to obtain candidate triples using semantic role labelling (SRL). SRL can be used for open information extraction since given some text, it identifies verbs, which usually correspond to relations, together with their arguments, which usually correspond to the subject and object of those relations. For example, given the sentence "A heart attack can lead to arrhythmia," SRL will identify "lead" as the main verb with "A heart attack" and "to arrhythmia" as its two arguments, ARG, from which a triple of the form (HeartAttack leads Arrythmia) can be extracted.

According to the algorithm 1 above, the triple is extracted by using the function srlParse, which returns a set F of directed labelled graphs (V, E), called frames. Each one of which satisfies the following:

- it contains exactly one node nd (called main node) labelled T(nd)=VERB;
- every other node n is labelled with one of role types ARG0, ARG1, ARG2;
- every node is labelled with some string L(n)=phr that is a phrase from sent;
- for nd the main node, there is an edge (nd, arr) labelled T((nd,arr))=ARGUMENT such that arr is an ordered list of nodes.

Only nodes labelled VERB have edges labelled ARGUMENT. Such a graph is called an SRL-graph of sent. The graph is stored as electronic data in the memory 204 (FIG. 2), for subsequent retrieval by the processor 202.

Focus is made on arguments of types ARG0, ARG1, and ARG2, since these roughly correspond to the thematic roles of PROTO-AGENT, PROTO-PATIENT, and INSTRUMENT, respectively, and hence capture of the semantic triples in the sense that some medical entity (disease, symptom, drug, organism) is causing some event or action to some other entity. The electronic data defining the graph is retrieved and the SRL-graph is scanned to extract triples (binary relations). This is accomplished using the function seekAndGet (as shown in algorithm 1), which is defined next.

Definition 2. Given an SRL-graph F, a role type A and a set of role types, T, function seekAndGet(F,A,T) returns the smallest set of triples Tr such that if F contains a node nd labelled VERB with arr its arguments and arr[i] and arr[j] exists with i<j, T(arg1)=A and T(arg2) in T, then Tr contains (L(arr[i])L(nd)L(ass[j])).

Once the triple has been obtained, at step 104 (see FIG. 4), the elements of the semantic triple are stored in the memory 204 (FIG. 2) as electronic data. Still at step 104, the processor retrieves the electronic data defining the elements of the semantic triple and associates them with entities (a concept or properties) from the knowledge base 13 (see FIG. 1) by selecting proper Internationalized Resource Identifiers (IRIs). The IRIs are stored as electronic data in the memory 204 (FIG. 2).

Some semantic triples may be unsuitable for inclusion in the knowledge base 13. For instance, some semantic triples may be uninformative, or even erroneous. Next are described various techniques for removing such unsuitable semantic triples and only transmitting suitable semantic triples onwards for linking to the knowledge base 13. The techniques for removing such unsuitable semantic triples described below may be used in conjunction with one another by applying one technique after another in series. However, not all of the techniques described below may be required, depending upon the circumstances. Accordingly, each technique, or method, described below is described independently of the other techniques, or methods, and may be implemented alone or in series with one or more of the other techniques or methods.

Figure 5:
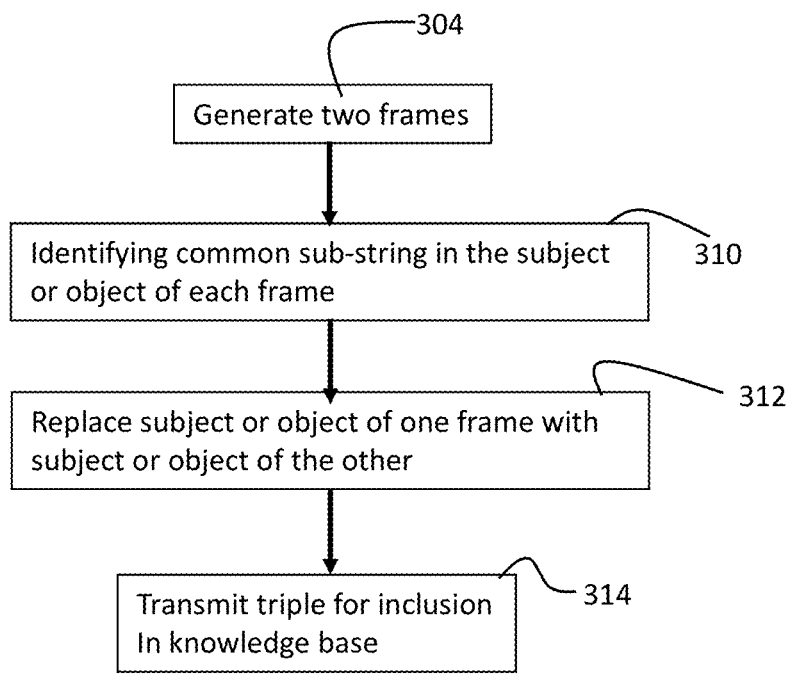
FIG. 5 shows a flow chart of processing a semantic triple to remove taxonomic relations for inclusion in the knowledge base according to an embodiment.

With reference to FIG. 5, taxonomic relations are resolved starting with step 304. First, a description of a taxonomic relation will be described.

Some sentences include a main verb, and also a taxonomic verb. The taxonomic verb usually defines a taxonomic relationship, i.e., may have a categorising function. Taxonomic information is encoded in Knowledge Bases using the subClassOf property, while in text this property is usually expressed via the use of verbs having a base verb "to be," namely the verbs "is" or "are." Example sentences include the following:

"Optic neuritis is a common symptom that can cause blurred vision"

"blackheads are follicles that have a wider than normal opening"

"Malaria is a serious tropical disease spread by mosquitos"

Knowledge Bases are usually rich in taxonomic relations, hence extracting these from text may create redundant triples that don't actually need to be extracted and transmitted. In situations like these, the SRL-graph would contain at least two frames; one for the taxonomic and one for the main verb. A precise triple can be extracted by selecting some argument from the frame of the taxonomic verb to connect it with some argument from the frame of the main verb and then use the main verb as a property. This process resolves the taxonomic verb and is performed using algorithm 2 below.

---

Input: A sentence sent and a set of frames F computed for sent.
1: Tree := dependencyParser(sent)
2: if $(n_1, n_2) \in$ Tree such that $\langle n_1, n_2 \rangle \ell ==$ cop then
3:     Let $F_{is}$ be the frame in F with the copula verb -continued 4:     Let $F_{n1}$ a frame different from $F_{is}$ that contains $n_r\ell$ in some argument Arg
5:     If no such $F_{n1}$ exists then return
6:     Let $\langle n_1, n \rangle \in$ Tree such that $\langle n_1, n \rangle.\ell$ = nsubj
7:     Replace Arg with the argument in $F_{is}$ that contains $n_1.\ell$ as substring
8:     Delete frame $F_{is}$
9: end if At step 310, when applied on the first sentence, SRL-parsing identifies two frames, F1 with verb "is" and arguments "Optics neuritis" and "a common symptom that can cause blurred vision" and F2 with verb "cause" and arguments "a common symptom that" and "blurred vision." Each frame, F1, F2, is stored as electronic data in the memory 204 (FIG. 2). As can be seen, the existence of this additional information makes it difficult to extract a triple of the form (OpticNeuritis causes BlurredVision) as the relevant entities denoting the subject and object of this triple appear in two different frames that are not interconnected. To alleviate this issue, at step 312, the main argument of the first frame, that contains the verb "is," is propagated to the respective argument of the second frame—that is, in the above example, replace the argument "a common symptom that" in the second frame with "Optic neuritis." This is accomplished by using dependency parsing implemented via an abstract method which is formally defined next.

Definition 3. Let phrase be a text. Function dependency-Parser takes phrase as input and returns a labelled tree, where each node (nd) is labelled with its corresponding word found in text (denoted by node.l) and each edge (nd1, nd2) with one of the dependency relations (denoted by (nd1, nd2).l), and all paths of edges (nd$_i$, nd$_{i+1}$) labelled with compound are collapsed to one node nd1 with label nd1.l+ ""+ . . . +""+ndn.l where + denotes string concatenation. The labelled tree is stored as electronic data in the memory 204 (FIG. 2).

Given a set of frames F computed for a sentence, and retrieved from the memory 204 (FIG. 2), function eliminateTaxonomicRelations described in algorithm 1 attempts to replace the phrase by propagating information from one frame to the other in an effort to eliminate the taxonomic information that may be identified in a sentence.

Consider the running example with optic neuritis and frames F1 and F2. Dependency parsing on the sentence returns a tree with a pair of nodes ("symptom", "is") annotated with dependency relation cop. Moreover, the tree also contains edge ("symptom", "neuritis") labelled with nsubj and finally string "symptom" appears as a sub-string in arguments of both frames F1 and F2. Then, argument "a common symptom that" in F2 is replaced with argument "Optic neuritis" from F1. Frame F2 would now contain verb "cause" and arguments "Optic neuritis" and "blurred vision" from which the desired triple can be extracted. Frame F2, as modified, is stored in the memory 204 (FIG. 2) as electronic data, and frame F1 is discarded.

In this way, as shown in FIG. 5, a method of generating a semantic triple includes providing a sentence associated with unstructured text including a main verb and a taxonomic verb, the taxonomic verb describing a taxonomic relationship (step 102 from FIG. 4). At step 304, the sentence is retrieved from the memory 204 and the first and second frames are generated when the processor 202 executes the semantic triple generator 28 (FIG. 3). The first frame, F1, includes a first subject, a first relation, and a first object, the first relation including the main verb, wherein the first subject and the first object each include a phrase including one or more sub-strings. The second frame, F2, includes a second subject, a second relation, and a second object, the second relation including the taxonomic verb, wherein the second subject and the second object each include a phrase including one or more sub-strings. The first and second frames, F1, F2, are stored as electronic data in the memory 204 (FIG. 2). At step 312, the processor 202 retrieves the first and second frames, F1, F2, and identifies a common sub-string in the first subject and either the second subject or the second object, or a common sub-string in the first object and either the second subject or the second object. The semantic triple generator 28 generates a semantic triple using the first frame, F1, and replaces the first subject or the first object having the common sub-string with the second subject or the second object having the common sub-string. At step 314, the processor 202 transmits the semantic triple for inclusion as a data pattern in the knowledge base.

In other words, the processor 202 transmits the semantic triple to the knowledge base directly as electronic data to be stored in the memory 202, or the processor 202 transmits the semantic triple of further processing according to one or more of the other methods described herein, and ultimately stored in the memory as electronic data after further processing has taken place. In this way, only higher quality triples are added to the knowledge base 13 and so subsequent processing to retrieve triples during use of the knowledge base 13, for any of the reasons described above, will be reduced, thus providing increased processing efficiency.

Figure 6:
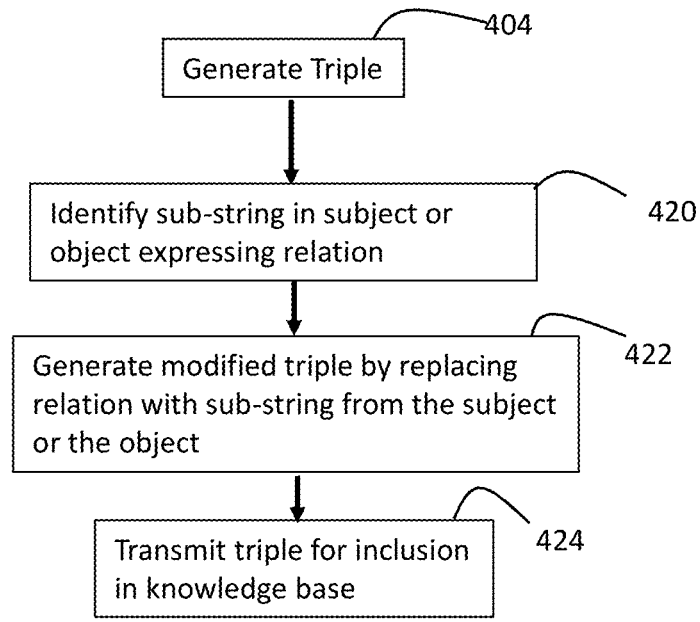
FIG. 6 shows a flow chart of processing a semantic triple derived from a noun centric sentence, according to an embodiment.

With reference to FIG. 6, another post-processing method aims to create triples where the relation is not expressed as a verb but via a noun. In particular, as described in more detail below, the method includes generating a sentence at step 102 (FIG. 3). At step 404, the semantic triple is generated as described above. Next, at step 420, a sub-string in the subject is identified which expresses a relation between the other sub-strings of the subject and the object, or a sub-string of the object expresses a relation between the other sub-strings of the object and the subject. Next, at step 422, a modified semantic triple is generated by replacing the relation of the triple with the sub-string of the subject or the object which includes the identified sub-string. In addition, the subject or the object, including the sub-string identified as a relation, as a whole is replaced using the remaining sub-strings that have not been used to replace the relation of the triple. Finally, at step 424, the modified semantic triple is transmitted for inclusion in the knowledge base 13 (see FIG. 1), as a data pattern.

In other words, the processor 202 transmits the modified semantic triple to the knowledge base directly as electronic data to be stored in the memory 202, or the processor 202 transmits the semantic triple of further processing according to one or more of the other methods described herein, and ultimately stored in the memory as electronic data after further processing has taken place. In this way, only higher quality triples are added to the knowledge base 13 and so subsequent processing to retrieve triples during use of the knowledge base 13, for any of the reasons described above, will be reduced, thus providing increased processing efficiency.

Example sentences where nouns are used to express relations include:
   "Common symptoms of malaria include fever"
   "Side effects of rituximab can include nausea"
   "Anemia is a common symptom of sarcoidosis"

Since conventional SRL-parsing is verb-centric, it is not capable of extracting the desired triple from the above sentences. Applied to the first sentence, the SRL-parser would return a single frame with verb "includes" and arguments "symptoms of malaria" and "fever" from which the triple ("fever" "includes" "symptoms of malaria") would be extracted. In a similar way from the last sentence a triple of the form ("Anemia" "is" "a common symptom of sarcoidosis") would be extracted. To be able to also extract triples from such sentences, dependency parsing is used. Algorithm 3 (below) takes as input a triple with property either the verb "includes" or the verb "is" and tries to rewrite the triple by lifting some noun from either the subject or the object position to be the property (relation) of the semantic triple. In this way, the relation of the triple is replaced with a sub-string from the subject or the object, as per step 422 above.

---
Input: A triple where verb is either "is" or "includes"
1: Tree := dependencyParser(phr$_2$)
2: Let root be the root if the tree
3: if root is a noun then
4:     Let nd be the closest descendard node of root that is also a noun
5:     Replace verb with root$^t$ and phr2 with nd$^t$
6: end if

---

In the running example ("fever" "includes" "common symptoms of malaria") would be rewritten as ("malaria" "symptoms" "fever") since the dependency tree of "common symptoms of malaria" contains "symptoms" as a root and "malaria" as the nearest noun annotated node to it. In this way, the method involves, at step 424, generating a modified semantic triple by replacing the relation with a sub-string from the subject or the object, which sub-string expresses a relation.

By resolving taxonomic relations and by expressing noun based relations, the triples added to the knowledge base are of higher value and so will reduce the amount of processing required to use the knowledge base when searching for triples, for example when used in automated medical diagnostic tasks.

Figure 7:
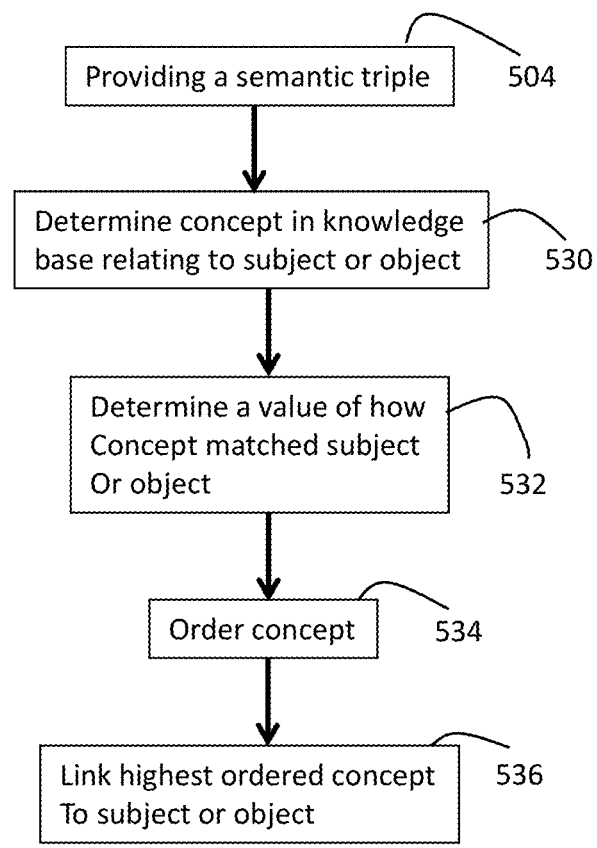
FIG. 7 shows a flow chart of processing a semantic triple including a phrase not included in the knowledge base according to an embodiment.

In FIG. 7, a flow diagram is shown describing how to link a new phrase to the knowledge base. Since the goal is to add extracted triples to the knowledge base 13 (see FIG. 1), IRIs (e.g., identifiers) need to be associated with the strings of candidate triples, also known as entity linking. Traditional approaches to entity linking work well for simple noun phrases containing one or two tokens, e.g., "Fever," "Severe Headache," "Vivax Malaria" etc., however, they are not likely to behave well for larger more complex phrases like l1="medications to manage blood sugar level" or l2="Severe Pain in Left Leg" which are common in the medical domain. Applied on l1, annotators like GATE and MetaMap trained over UMLS returns entities Medication, Management, Blood, and Bloodglucoselevel whereas the ideal entity from this corpus is BloodSugarManagement. SRL tends to compute arguments that capture large parts of a sentence, hence making it particularly prone to the above issue.

To address these issues, an algorithm is proposed that uses text annotation tools and sentence embeddings in order to try and associate IRIs to complex phrases, and entity creation in the knowledge base for those phrases that don't seem to exist already.

With reference to FIG. 7, a semantic triple is provided at step 504, and may be the semantic triple transmitted in steps 314 and 424 in FIGS. 5 and 6. Given a knowledge base 13, vector representations for all its entities can be computed in a pre-processing step. Given a phrase, its vector can also be computed and then compared using angular distance with the vectors of the knowledge base to find the most similar entity. In other words, as shown in step 530, a concept in the knowledge base is determined that relates to the subject or the object. Next, in step 532, a value is determined of how a concept matches a subject or object.

$$sim(u_l, v_q) = \left(1 - \arccos\left(\frac{u_l \times u_q}{|u_l| \cdot |u_q|}\right)\right/\pi\right) \quad (1)$$

Where $u_1$ is the vector of a label from the knowledge base (either l=prefLabel or altLabel) in the embedding space and $u_q$ is the vector of the subject or object of a triple. The preferred and alternative labels are distinguishable due to their differences in specificity. The former usually act as keys and are unique per sty in the knowledge base, however, the latter may be used in a more loose synonymous way and may have overlaps between different classes, even of the same type.

Definition 4. Let KB be a knowledge base, let prefs be all preferred labels and alts all alternative labels in KB. Let also GATE be some text annotator trained on KB and let k be some positive integer. Then, given some phrase q with vector $v_q$, the list of candidate IRIs Candiri is defined as follows:

$$\left\{GATE(q), \underset{l \in prefs}{\arg\max}^k sim(u_l, v_q), \underset{l \in alts}{\arg\max}^k sim(u_l, v_q)\right\}$$

where $\arg\max^k_{l \in prefs}$ is the top-$k$ argmax function

The list of candidate IRIs is used to display the possible IRIs from the KB that can be used to disambiguate the phrases encountered in text. As shown in step 534, the above list of IRIs can be ordered, according to their value, to display first the most likely IRI. In particular, the ordering approach is the following:

If the first set in Candiri is a singleton set that covers the entire phrase then order this element first (covering can be checked by the offsets returned by the annotator).

Merge the second and third sets and order them according to similarity score, but give elements from the second set a higher priority by penalising the scores of the third set by some factor.

Once the highest ordered IRI is known, it is possible to add the new triple in the knowledge base linked to the highest ordered IRI.

Figure 8:
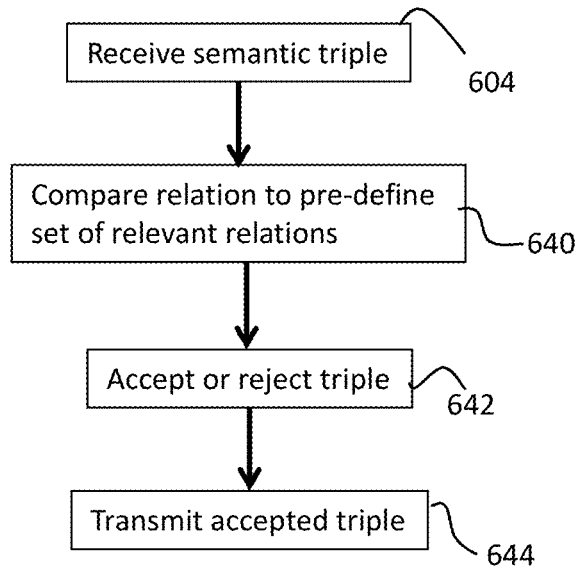
FIG. 8 shows a flow chart of filtering semantic triples according an embodiment.

With reference to FIG. 8, there is provided a method of filtering unsuitable triples. At step 604, a triple is received by the filtering module 30 (see FIG. 2). The triple received may be the triple that is transmitted in step 314 (FIG. 5) or step 424 (FIG. 6), for example, or may be tripled derived directly at step 104 (FIG. 4). Such triples may include general statements, e.g., about medical entities, and this can lead to uninformative triples like (Malaria treatedBy Drug). Although factually correct, these triples are not useful from a clinical or diagnostic perspective and importing them in the knowledge base is introducing a type of noise. Consequently, the following filtering is applied:

In step 640, the relation of a triple is compared to a pre-defined set of relations. The pre-defined set of relations may be stored in a look-up table stored as electronic data in the memory 204 (FIG. 2). The pre-defined set of relations may include approximately 30 properties, the most important of which are the following: cause, treat, affect, characterize, develop, lead, aggravate, alleviate, damage, obstruct, trigger, transmit, spread, prevent, produce, misdiagnose, induce.

In step 642, the triple is either accepted or rejected based on the relation being present or not in the set of pre-defined triples. In step 644, an accepted triple is transmitted for inclusion in the knowledge base, and a rejected triple is discarded.

In other words, the processor 202 transmits the semantic triple to the knowledge base 13 directly as electronic data to be stored in the memory 202, or the processor 202 transmits the semantic triple of further processing according to one or more of the other methods described herein, and ultimately stored in the memory as electronic data after further processing has taken place. In this way, by filtering the triples, fewer triples are transmitted to the memory 204 and a reduction in bandwidth can be realised. In addition, fewer unsuitable triples are added to the knowledge base 13 and so subsequent processing of the knowledge base 13 is reduced.

Figure 9:
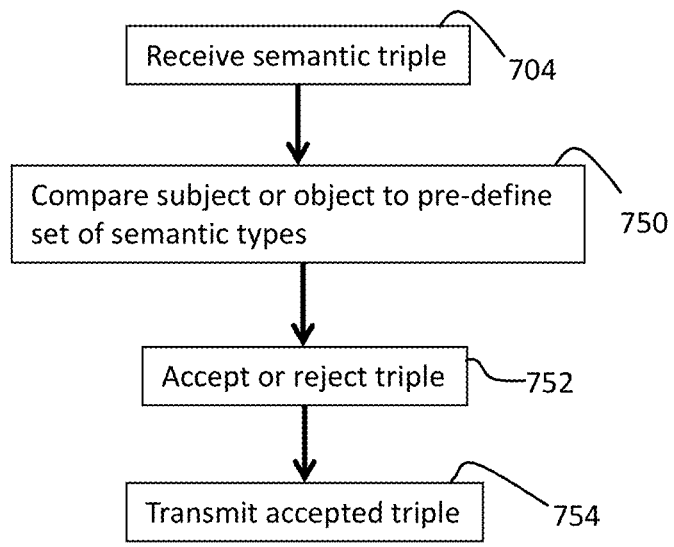
FIG. 9 shows a flow chart of filtering semantic triples according to a further embodiment.

With reference to FIG. 9, there is shown a further method of filtering unsuitable triples. At step 704, a triple is received. The received triple may be any of the triples according to step 104 (FIG. 4), step 314 (FIG. 5), step 424 (FIG. 6), and step 644 (FIG. 8). In step 750, the subject or the object is compared to the pre-defined set of semantic types. The pre-defined set of semantic triples may be in the form of a look-up table stored as electronic data in the memory 204 (FIG. 2). The pre-defined set of semantic types includes ClinicalFinding, Disease, Substance, Procedure, Animal, ManufacturedObject, BodyPart, Body Substance, BiologicalFunction, Behaviour, and Organism.

In step 752, the triple is accepted or rejected based on the subject or the object being of a semantic type from the predefined set. In step 754, the triple is transmitted for inclusion in the knowledge base upon acceptance, or the triple is discarded if it has been rejected.

In other words, the processor 202 transmits the semantic triple to the knowledge base 13 directly as electronic data to be stored in the memory 202, or the processor 202 transmits the semantic triple of further processing according to one or more of the other methods described herein, and ultimately stored in the memory as electronic data after further processing has taken place. In this way, by filtering the triples, fewer triples are transmitted to the memory 204 and a reduction in bandwidth can be realised. In addition, fewer unsuitable triples are added to the knowledge base 13 and so subsequent processing of the knowledge base 13 is reduced.

A further method of filtering prunes erroneous triples. For example, if according to the knowledge base, the relation treatedBy is supposed to connect a class of type Disease to a class of type Drug, then a triple of the form (Plasmodium treatedBy Artemisinin) is incorrect since the type of Plasmodium is Organism.

Figure 10:
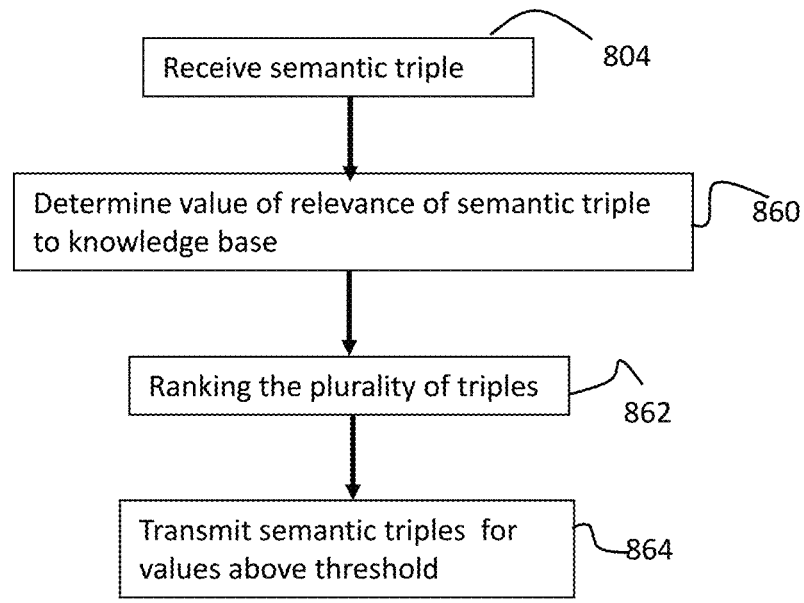
FIG. 10 shows a flow chart of ranking semantic triples for inclusion in the knowledge base according to an embodiment.

With reference to FIG. 10, there is provided a method of scoring the triples by the scoring module 32 (FIG. 3). Even with all previous filtering, the number of triples can be very large and managing them can be erroneous. In this way, the method described in FIG. 10 may be a continuation of the method described above in relation to processing or filtering the semantic triples. In this way, at step 804, a triple is received by the scoring module 32 (FIG. 3). The triple may be the triple according to any of steps 104 (FIG. 4), 314 (FIG. 5), 424 (FIG. 6), 536 (FIG. 7), 644 (FIG. 8), and 754 (FIG. 9). It would be beneficial if the triples could be scored according to some model and focus the resources of the domain expert to validate the most likely correct ones. A simple way to score triples is to determine a value of the relevance of the semantic triple to the knowledge base, as per step 860. For instance, the value could be a frequency of extraction that is the number of times the triple was extracted from a group of sources. The more times a triple was extracted, the more likely it is to be correct. Another way is by exploiting the model induces by a given knowledge base. That is, we can learn a model from the structure of the knowledge base and then use this model to score the extracted triples. This score will capture the degree to which each triple adheres to the statistically most frequent patterns of our knowledge base. The score can be stored as electronic data in the memory 204 (FIG. 3).

In step 862, the triples may be ranked according to their numerical value. In step 864, a score above a threshold would permit transmission of the triple for inclusion in the knowledge base. A score below the threshold would discard the triple. The threshold may be a numerical number defined be electronic data stored in the memory 204 (FIG. 2).

As described above, whilst the foregoing methods of processing and filtering the semantic triples each describe transmitting the triple for inclusion in the knowledge base, such transmission may include transmitting the triple for processing or filtering by the other respective methods. In other words, the foregoing methods of processing and filtering may not be used exclusively and may be used complimentary to one another in order to augment the knowledge base to include better quality triples in the knowledge base and reduce the amount of poor quality triples being transmitted to the knowledge base.

Figure 11:
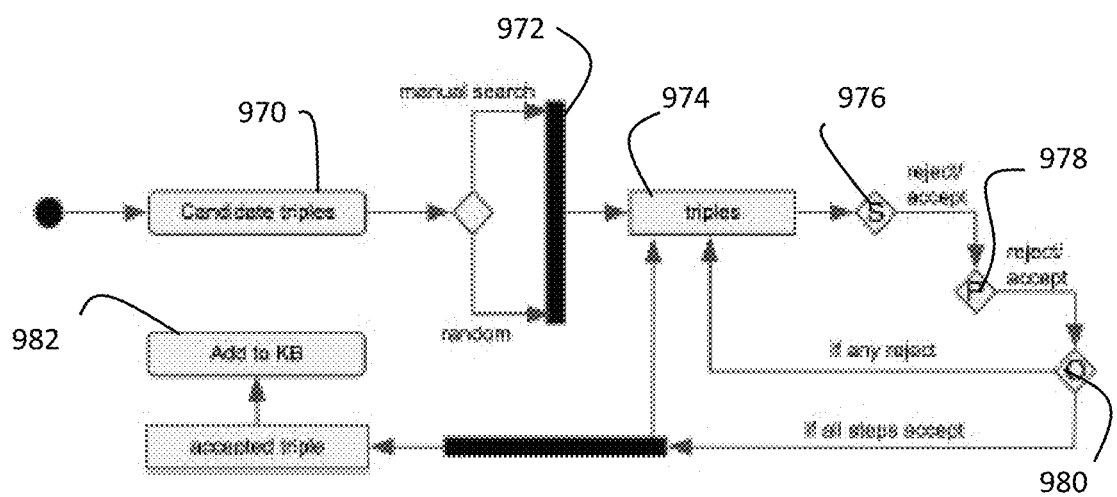
FIG. 11 shows a flow chart associated with operation of the verification system from FIG. 3.

With reference to FIG. 11, there is provided a flow of operation of the verification module. The verification modules serves as a bridge between noisy data of automated information extraction and medically correct and sage information aligned with the knowledge base. The verification system was built to provide support for two separate tasks:

Adding a new property (link) between two existing concepts of the knowledge base;

Creating a new concept and aligning it with an existing concept in the knowledge base.

The first task is broken down into two sub-tasks: verifying the correctness of the extracted candidate triple and verifying the correctness of the IRIs assigned to the phrases of the triple (entity linking).

As shown in FIG. 11, the candidate triples are received at step 970. The candidate triples are received from the semantic triple generation module 24 (see FIG. 2), and may have been post-processed, filtered, and/or scored according to the foregoing methods. A manual search or a random retrieval at step 972 is used to select a sub-set of the candidate triples for verification. In particular, the triples can be retrieved from the electronic data stored in the memory 204 (FIG. 2). At step 974, the triples are assessed by the domain expert using the user interface 5 from FIG. 1. In particular, at step 976, the subject is verified, at step 978, the relation is verified, and at step 980, the object is verified. Acceptance of all three tasks (in cases where the triple is factually correct and appropriate IRIs in the knowledge base have been attached) means that the whole triple can safely be added to the knowledge base at step 982. In particular, the triple can be added as a data pattern in the knowledge base. In case any of the tasks are rejected then, the whole triple is rejected. However, if experts verified any of the proposed entity mappings, these acceptances will be saved. In the future, no task that has been verified before is repeated, e.g., if some phrase has been linked to a concept, C, in the text and the same phrase appears in another triple in the future with the same attached concept, C, no verification will be performed by the entity link, it would be automatically accepted. To speed up the procedure, and make it less error prone, several domain experts may be used for each triple, and groupings on the triples according to semantic types are also used to, e.g., focus verification on triples related to drugs, symptoms, or diseases.

Besides the use of embeddings to try and map complex text phrases to entities in the knowledge base, it is not infrequent in open information extraction that no IRI can be associated to an extracted phrase or that the associated IRI is wrong. This issue is more acute in the medical domain due to the vast size and variety of medical terms and its high compositionality. For that reason, the verification module provides the option to introduce in the knowledge base a new IRI (e.g., new identifier) for a newly encountered entity, i.e., one for which the knowledge base does not contain an IRI. The important issue in introducing a new entity is where to connect it in the existing hierarchy, i.e., which concept from the knowledge base to declare as its superconcept.

A new IRI can be created with a label according to the phrase encountered in the text. For instance, if the text encountered is "Severe Pain in Left Leg" for which no entity in the knowledge base 13 exists, then a new entity with IRInew can be added to the knowledge base with label "Severe Pain in Left Leg." This new entity needs to be linked in the hierarchy of the knowledge base. To determine this, the label is analysed further using tools like dependency parsing and existing tools like ConceptBuilder. Applied on the above label ConceptBuilder will extract the triple (PainInLeftLeg hasSeverity Severe), where both subject and object are specific IRIs from the knowledge base. From that triple it can be inferred that IRInew introduced for concept SeverePainInLeftLeg would need to be a subClassOf PainInLeftLeg that is (SeverePainInLeftLeg subClassOf PainInLeftLeg).

The invention claimed is:

1. A computer-implemented method of verifying a semantic triple generated for building a knowledge base including data patterns defining concepts associated with semantic triples derived from unstructured text, the method comprising:
   providing the semantic triple to a user interface, the semantic triple including a subject, an object, and a relation;
   receiving, from the user interface, an acceptance or a rejection of the subject, the object, and the relation as relevant or not to the knowledge base; and
   transmitting the semantic triple for inclusion as a data pattern in the knowledge base in the event that all of the subject, the object, and the relation, have been accepted.

2. The method of claim 1, further comprising storing in a database an accepted or a rejected subject, object, or relation, from a verified semantic triple.

3. The method of claim 1, further comprising comparing the semantic triple to the database, and providing the semantic triple to the user interface if the semantic triple has not been provided to the user interface previously, and discarding the semantic triple if the triple has been accepted or rejected previously.

4. The method of claim 1, further comprising adding a new identifier for a newly encountered entity.

5. The method of claim 1, further comprising verifying a correctness of the semantic triple.

6. The method of claim 1, further comprising verifying assigned phrases of the semantic triple.

7. The method of claim 1, further comprising performing a search for candidate triples for verification.

8. A system including a processor, and a memory, the memory including instructions which, when executed by the processor, cause the processor to perform a method of verifying a semantic triple generated for building a knowledge base including data patterns defining concepts associated with semantic triples derived from unstructured text, the method comprising:
   providing the semantic triple to a user interface, the semantic triple including a subject, an object, and a relation;
   receiving, from the user interface, an acceptance or a rejection of the subject, the object, and the relation as relevant or not to the knowledge base; and
   transmitting the semantic triple for inclusion as a data pattern in the knowledge base in the event that all of the subject, the object, and the relation, have been accepted.

9. The system of claim 8, wherein the method further comprises storing in a database an accepted or a rejected subject, object, or relation, from a verified semantic triple.

10. The system of claim 8, wherein the method further comprises comparing the semantic triple to the database, and providing the semantic triple to the user interface if the semantic triple has not been provided to the user interface previously, and discarding the semantic triple if the triple has been accepted or rejected previously.

11. The system of claim 8, wherein the method further comprises adding a new identifier for a newly encountered entity.

12. The system of claim 8, wherein the method further comprises verifying a correctness of the semantic triple.

13. The system of claim 8, wherein the method further comprises verifying assigned phrases of the semantic triple.

14. The system of claim 8, wherein the method further comprises performing a search for candidate triples for verification.

15. A non-transitory computer-readable medium including instructions which, when executed by a processor, cause the processor to perform a method of verifying a semantic triple generated for building a knowledge base including data patterns defining concepts associated with semantic triples derived from unstructured text, the method comprising:
   providing the semantic triple to a user interface, the semantic triple including a subject, an object, and a relation;
   receiving, from the user interface, an acceptance or a rejection of the subject, the object, and the relation as relevant or not to the knowledge base; and
   transmitting the semantic triple for inclusion as a data pattern in the knowledge base in the event that all of the subject, the object, and the relation, have been accepted.

16. The non-transitory computer-readable medium of claim 15, wherein the method further comprises storing in a database an accepted or a rejected subject, object, or relation, from a verified semantic triple.

17. The non-transitory computer-readable medium of claim 15, wherein the method further comprises comparing the semantic triple to the database, and providing the semantic triple to the user interface if the semantic triple has not been provided to the user interface previously, and discarding the semantic triple if the triple has been accepted or rejected previously.

18. The non-transitory computer-readable medium of claim 15, wherein the method further comprises adding a new identifier for a newly encountered entity.

19. The non-transitory computer-readable medium of claim 15, wherein the method further comprises verifying a correctness of the semantic triple.

20. The non-transitory computer-readable medium of claim 15, wherein the method further comprises verifying assigned phrases of the semantic triple.

* * * * *